United States Patent [19]

Yaginuma et al.

[11] Patent Number: 5,367,432
[45] Date of Patent: Nov. 22, 1994

[54] INSTRUMENT CURRENT TRANSFORMER FOR POWER CABLES

[75] Inventors: Kyuji Yaginuma, Katsuta; Takehiro Kikuchi, Hitachi; Hiroshi Suzuyama; Shigeru Fujiya, both of Hitachioota, all of Japan

[73] Assignee: Hitachi, Ltd., Tokyo, Japan

[21] Appl. No.: 32,326

[22] Filed: Mar. 17, 1993

[30] Foreign Application Priority Data

Mar. 17, 1992 [JP] Japan .................................. 4-060545

[51] Int. Cl.⁵ .............................................. H02B 7/00
[52] U.S. Cl. ...................................... 361/620; 336/5; 361/836
[58] Field of Search ............... 361/605, 620, 623, 836; 336/5, 12, 174, 175, 176

[56] References Cited

U.S. PATENT DOCUMENTS

| | | | |
|---|---|---|---|
| 2,841,772 | 7/1958 | Sloop | 336/5 |
| 3,160,839 | 12/1964 | Bennon et al. | 336/5 |
| 4,338,657 | 7/1982 | Lisin et al. | 336/5 |

FOREIGN PATENT DOCUMENTS 179418 11/1984 Japan .
14819 1/1986 Japan .

*Primary Examiner*—Gregory D. Thompson
*Attorney, Agent, or Firm*—Antonelli, Terry, Stout & Kraus

[57] ABSTRACT

An instrument current transformer for a main power cable which is composed of three power cables for three phases disposed in a power cable laying hole and three current transformer coils for the three phases, each of the three current transformer coils surrounding a corresponding one of the three power cables, the instrument current transformer including: a plurality of upper circumferential installation unit members disposed near an end portion of the power cable laying hole along circumference sides of an opening portion of the power cable laying hole, each of the upper circumferential installation members being provided with at least one securing portion extending in a radial direction and the upper circumferential installation unit members being secured to the end portion of the power cable laying hole via respective at least one securing portions; three axial installation members for the three phases, each extending along corresponding ones of the three power cables, first ends of the axial installation members being connected to the upper circumferential installation unit members and the three current transformer coils for the three phases being supported by corresponding ones of the three axial installation members; and a plurality of lower circumferential installation unit members having substantially a same configuration as corresponding ones of the upper circumferential installation unit members, the lower circumferential installation unit members being connected to second ends of the axial installation members opposite from the first ends.

7 Claims, 10 Drawing Sheets

INSTRUMENT CURRENT TRANSFORMER FOR POWER CABLES

BACKGROUND OF THE INVENTION

1. Field of the Invention

The present invention relates to an instrument current transformer for power cables and, in particular, relates to an instrument current transformer for power cables which is provided so as to surround power cables connected to a gas insulated switch gear device.

2. Description of Related Art

An instrument current transformer which is provided for a gas insulated switch gear device is usually disposed in a container filled with an insulating gas such as in a container accommodating cable heads, however, in accordance with a change in view point on a protection range in a power transmission system with an instrument current transformer due to an improvement in a reliability of electrical equipments, an instrument current transformer for power cables which is provided so as to surround the power cables connected to a gas insulated switch gear device has become to be used.

Examples of the above instrument current transformers for power cables are disclosed in JP(U)-A-59-179418(1984) and JP(U)-A-61-14819(1986). In the former, the power cables are disposed beneath the floor on which a gas insulated switch gear device is placed and the instrument current transformer for the power cables is constituted by current transformer coils surrounding these power cables. Further in the latter, the instrument current transformer for power cables is constituted by current transformer coils surrounding power cables disposed at a position above the floor on which the gas insulated switch gear device is placed, and between the installation floor and the lower end of a closed container which accommodates cable heads constituting the connecting member for the power cables.

However, because of a shortage of space in urban areas, current gas insulated switch gear devices are frequently built in underground spaces of buildings as underground substations so that a further small sizing and lowering stacking height of the gas insulated switch gear device are required. Therefore, with regard to the former conventional instrument current transformer for power cables, when there is an under story below the floor on which the gas insulated switch gear device is placed, the installation work of the instrument current transformer for power cables is easy. However when the gas insulated switch gear device is built in an underground space with no under stories, the work of laying power cables in an under hole and combining the current transformer coils therewith become very hard. Further, with regard to the latter conventional instrument current transformer for power cables, the distance between the installation floor and the lower end of the closed container accommodating the cable heads is more and more reduced because of the small sizing and stacking height lowering of the gas insulated switch gear device, and it becomes difficult to obtain a space required for the disposition and the installation work.

SUMMARY OF THE INVENTION

An object of the present invention is to provide an instrument current transformer for power cables of which a disposition and installation work are facilitated.

For achieving the above object according to the present invention, in an instrument current transformer for power cables having three phase current transformer coils each surrounding the corresponding three phase power cables disposed within a power cable laying hole, installation unit members having a securing portion are secured at side ends of an opening portion of the power cable laying hole, axial installation members for the respective three phases each connected to the respective installation unit members and extending along the power cable laying hole are respectively disposed, and the respective three phase current transformer coils are supported by the corresponding three phase axial installation members.

Since the instrument current transformer for power cables according to the present invention is disposed in the power cable laying hole near its opening portion, the instrument current transformer for power cables can be easily disposed even when a distance between the installation floor and the lower end of the closed container accommodating the cable heads is small. Accordingly, the small sizing and the stacking height lowering in a gas insulated switch gear device is not disturbed, and further, the instrument current transformer for power cables is secured in the power cable laying hole at the end portion thereof at the side of the opening portion and the disposition work and the installation work thereof are facilitated.

DETAILED DESCRIPTION OF THE EMBODIMENTS

Hereinbelow, embodiments according to the preferred present invention are explained with reference to the drawings.

Figure 1:
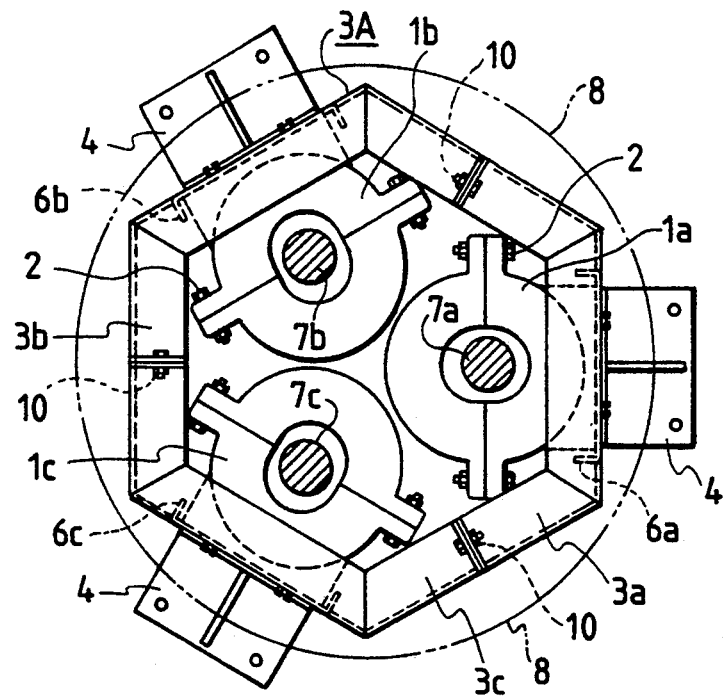
FIG. 1 is a plane view of one embodiment of the instrument current transformers for power cables according to the present invention.
Figure 2:
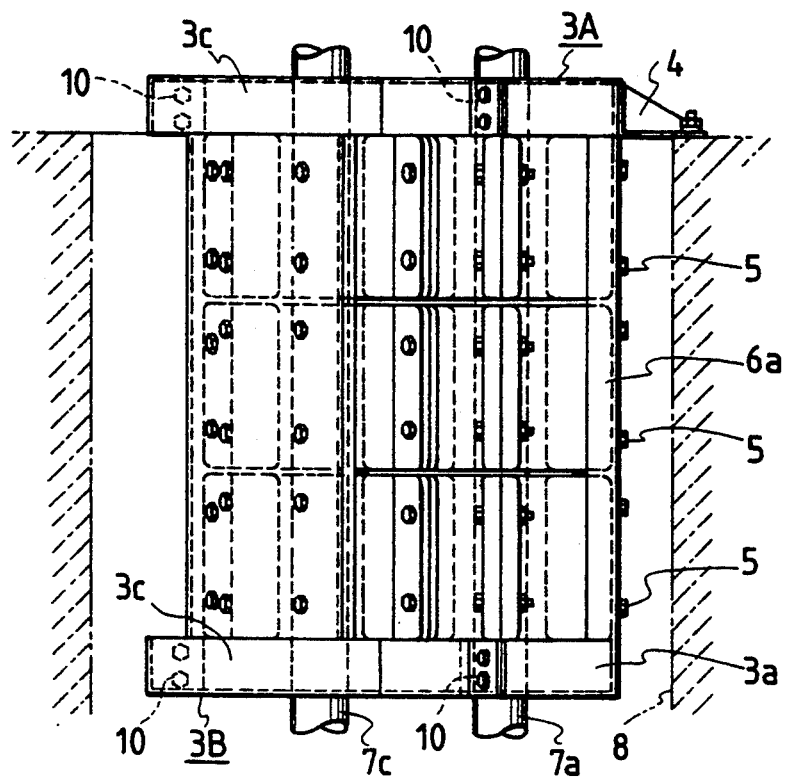
FIG. 2 is a front view of the instrument current transformer for power cables as shown in FIG. 1.

FIG. 1 and FIG. 2 are, respectively, a plane view and front view of one embodiment of the instrument current transformers for power cables.

A first encircled installation member 3A having a plurality of securing portions 4 is secured to the end portion at an opening portion locating upward of a power cable laying hole 8 as shown in FIG. 2. As will be seen from FIG. 1, the first encircled installation member 3A is divided into three circumferential installation unit members in its circumferential direction, and each is provided with a corresponding securing portion 4. The respective divided circumferential installation unit members 3a, 3b and 3c, each including the corresponding securing portion 4, are formed into substantially the same configuration and are connected via bolts so as to form a hexagonal encircled body as a whole. One end of three axial installation members 6a, 6b and 6c extending in the axial direction of the power cables 7a, 7b and 7c are respectively connected to the corresponding divided circumferential installation unit members 3a, 3b and 3c for the first encircled installation member 3A. The other ends of the respective axial installation members 6a, 6b and 6c are connected to the respective corresponding divided circumferential installation unit members 3a, 3b and 3c for a second encircled installation member 3B which is also constituted in the same manner as that for the first encircled installation member 3A. Current transformer coils 1a, 1b and 1c are respectively secured via bolts 5 to the axial installation members 6a, 6b and 6c which are located inside the first and second encircled installation members 3A and 3B, and these current transformer coils 1a, 1b and 1c are respectively constituted by coupling two divided portions in a circumferential direction via bolts 2.

Figure 3:
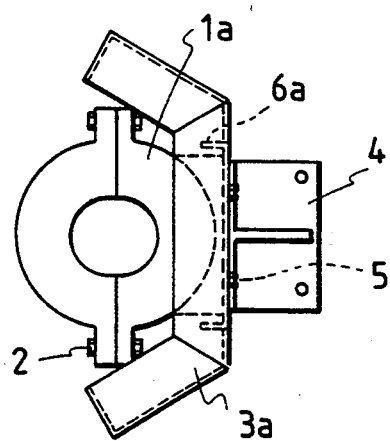
FIG. 3 is a plane view of a major portion of the instrument current transformer for power cables as shown in FIG. 1.
Figure 4:
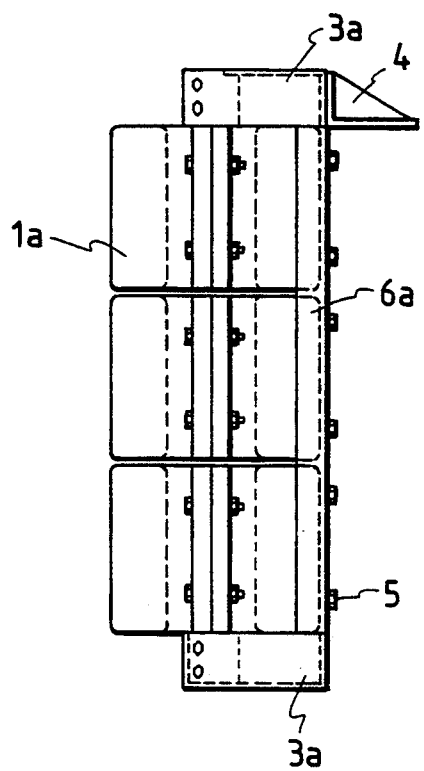
FIG. 4 is a front view of the major portion of the instrument current transformer for power cables as shown in FIG. 3.
Figure 5:
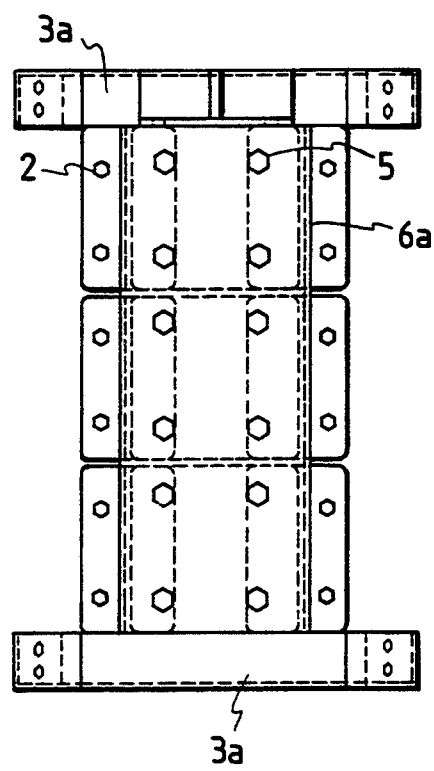
FIG. 5 is a side view of the major portion of the instrument current transformer for power cables as shown in FIG. 3.

When disassembling the instrument current transformer for power cables including the first and second encircled installation members 3A and 3B into three components for respective phases, the three disassembled portions for the respective phases have the same constitution. FIG. 3, FIG. 4 and FIG. 5 show one of the disassembled portions corresponding to one phase component of the instrument current transformer for power cables.

In particular, as illustrated in FIG. 4 which shows a front view of the disassembled portion for one phase, the axial installation member 6a is disposed between a pair of upper and lower circumferential installation unit members 3a connected thereto and, for example, three current transformer coils 1a which are arranged along a power cable 7a are attached to the axial installation member 6a with bolts 5. The pair of circumferential installation unit members 3a and the axial installation member 6a are formed in separate parts and thereafter can be integrated using a suitable securing process such as by welding. The width of the axial installation member 6a is limited to about the diameter of the current transformer coil 1a. Therefore even if the three circumferential installation unit members 3a, 3b and 3c are connected in an encircled shape as shown in FIG. 1, an enough space for working, for example, space for performing fastening work of the bolts 2 is designed to be formed between the adjacent axial installation members 6a, 6b and 6c.

Figure 6:
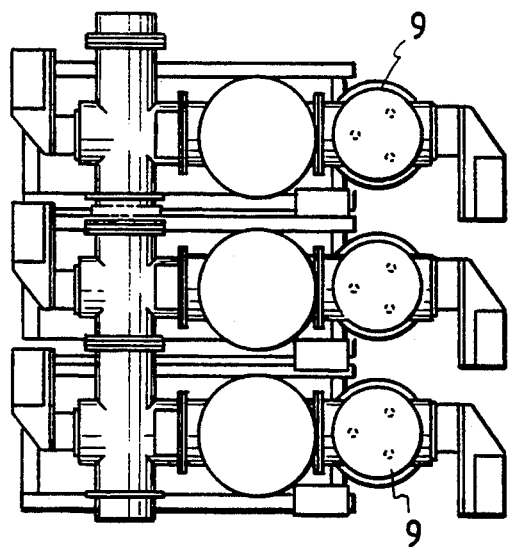
FIG. 6 is a plane view of a gas insulated switch gear device to which the instrument current transformer for power cables as shown in FIG. 1 is applied.
Figure 7:
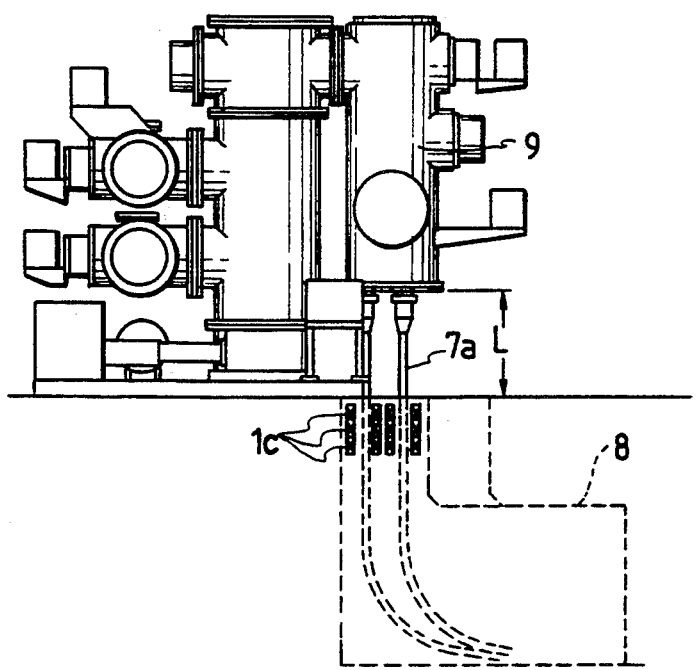
FIG. 7 is a front view of the gas insulated switch gear device as shown in FIG. 6.

Now, an assembling work of the instrument current transformer for power cables is explained. Here, the assembling work after the connection between the gas insulated switch gear device and the power cables is completed is exemplified. As illustrated in FIGS. 6 and 7, above the opening portion of the power cable laying hole 8 which is formed under the installation floor of the gas insulated switch gear device, a closed container accommodating cable heads for the gas insulated switch gear device is located and a certain small distance between the lower end of the closed container 9 and the installation floor is selected in order to reduce the size and the stacking height of the gas insulated switch gear device. Accordingly, the parts of the instrument current transformer for power cables are carried through the space determined by the distance L to perform the assembling work thereof.

Figure 8:
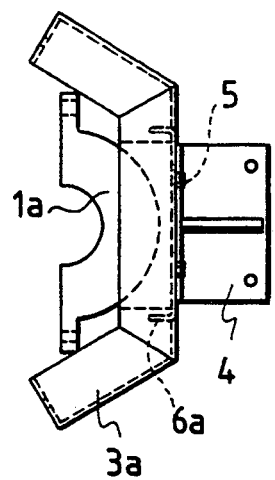
FIG. 8 is a plane view of a part of the major portion of the instrument current transformer for power cables as shown in FIG. 3.
Figure 9:
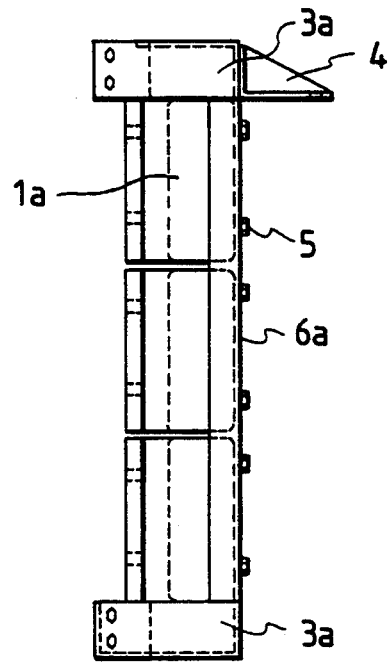
FIG. 9 is a front view of the part of the major portion of the instrument current transformer for power cables as shown in FIG. 8.

For the first time, three unit components of the instrument current transformer for power cables for three phases, one of which is illustrated in FIGS. 3, 4 and 5, are prepared. As illustrated in FIGS. 8 and 9, the current transformer coil 1a is divided into two parts by removing the respective bolts 2. Subsequently, the divided current transformer coils are inserted from the opening portion located above the power cable laying hole 8 as shown in FIG. 2 and then assembled with the bolts 2 so as to surround the power cable 7a. The other two unit components of the instrument current transformer for power cables for the remaining two phases are also inserted from the opening portion located above the power cable laying hole 8 and assembled in the same manner as above. During or after these works the first as well as the second encircled installation members 3A and 3B are constructed by connecting the respective circumferential installation unit members 3a, 3b and 3c in an encircled shape as shown in FIGS. 1 and 2 and further, the respective securing portions 4 are secured at the end of the opening portion located above the power cable laying hole 8.

The instrument current transformer for power cables as explained above is designed to be inserted through the opening portion located above the power cable laying hole 8 and to assemble the same therein, the assembling work is easily performed even if the size and the stacking height of the gas insulated switch gear device is reduced. Further, since both axial ends of the instrument current transformer for power cables are constituted by the first and second encircled installation members 3A and 3B each formed by connecting the circumferential installation unit members 3a, 3b and 3c in an encircled shape, an electromagnetic force acting between phases which is caused when a large current such as a short circuiting current flows through the power cables can be handled by the first and second encircled installation members 3A and 3B. Still further, in the instrument current transformer for power cables as explained above, the width of the axial installation members 6a, 6b and 6c, in other words, the width in a circumferential direction along the first and second encircled installation members 3A and 3B is reduced in order to form a large space between the adjacent axial installation members. Therefore the work for fastening the bolts 2 for the current transformer coils 1a, 1b and 1c is facilitated because of the large space provided. Moreover, in the present embodiment, since the unit components for the respective phases of the instrument current transformer for power cables are constituted in substantially the same configuration, the productivity thereof is increased. After an inspection test in a factory of a completed instrument current transformer for power cables, the same is disassembled into the respective unit components as shown in FIG. 3 through FIG. 5 and is transported in separate forms to a designated site where the disassembled components are reassembled. Therefore when marks for respective phases and identification marks for adjacent parts are applied to the respective parts and the parts are reassembled according to the marks, an instrument current transformer for power cables having the same performance characteristic obtained at the factory inspection test can be likely obtained. Further, when the instrument current transformer for power cables is assembled before the power cables 7a, 7b and 7c are laid, the instrument current transformer for power cables may be assembled beforehand in a form shown in FIG. 1 and then inserted from the upward into the power cable laying hole 8. Still further, the instrument current transformer for power cables having the above explained constitution can be applied to gas insulated switch gear devices other than that shown in FIGS. 6 and 7.

Figure 10:
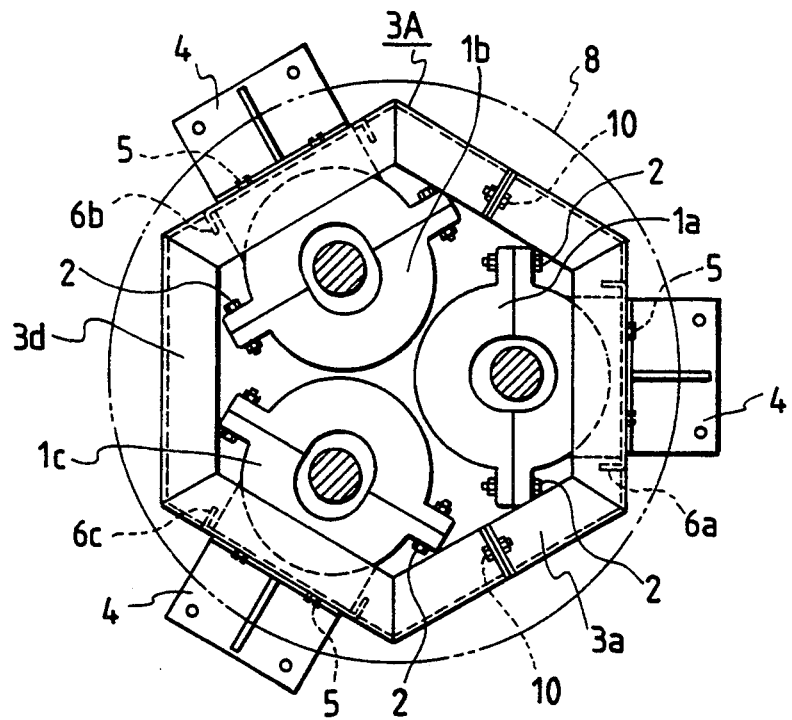
FIG. 10 is a plane view of another embodiment of the instrument current transformers for power cables according to the present invention.
Figure 11:
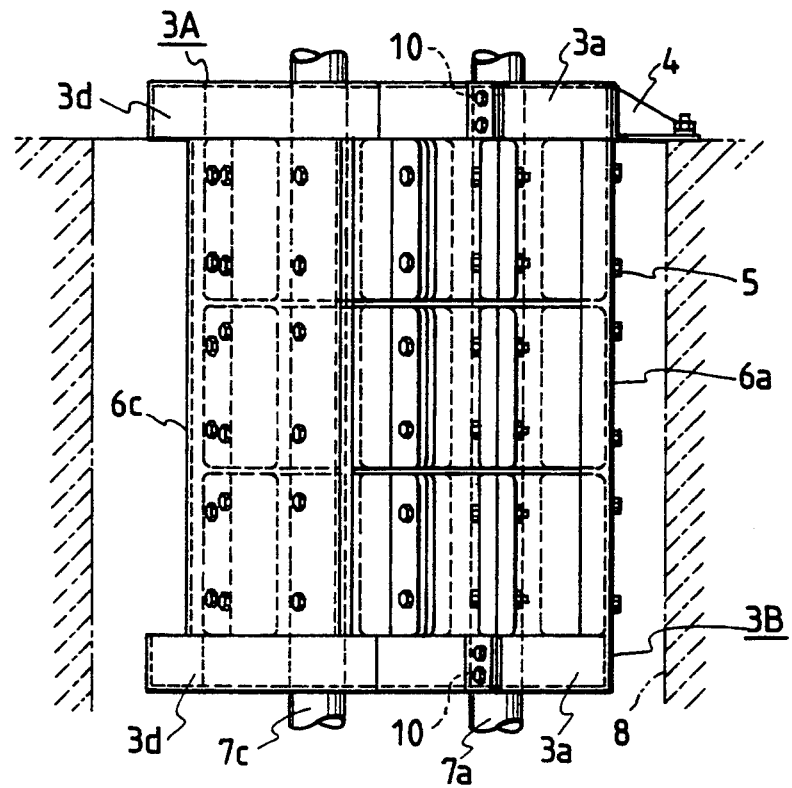
FIG. 11 is a front view of the instrument current transformer for power cables as shown in FIG. 10.

FIGS. 10 and 11 show respectively a plane view and a front view of another embodiment of the instrument current transformers for power cables according to the present invention.

When comparing the present embodiment with the previous embodiment, only the construction of the encircled installation members 3A and 3B differs from that in the previous embodiment. However the construction of the second encircled installation member 3B is identical with that of the first encircled installation member 3A like in the previous embodiment. Accordingly, only the encircled installation member 3A is explained here and detailed explanation of other equivalent elements is omitted by adding the same reference marks as in the previous embodiment. As seen from FIG. 10 the completed encircled shape of the first installation member 3A is hexagonal as in the previous embodiment. However, the first installation member 3A is constituted by connecting the two divided installation unit members in the circumferential direction via respective bolts 10. The construction of the installation unit member 3a is same as that of the previous embodiment. However the installation unit members 3b and 3c in the previous embodiment are combined integrally into an installation unit member 3d. Accordingly, the current transformer coils 1b and 1c are integrated together with the installation unit member 3d and inserted from the opening portion located above the power cable laying hole 8 to complete the assembly. However, since a diameter of enough size is selected for the power cable laying hole 8, the same advantages as have been obtained with the previous embodiment are also obtained with the present embodiment.

Figure 12:
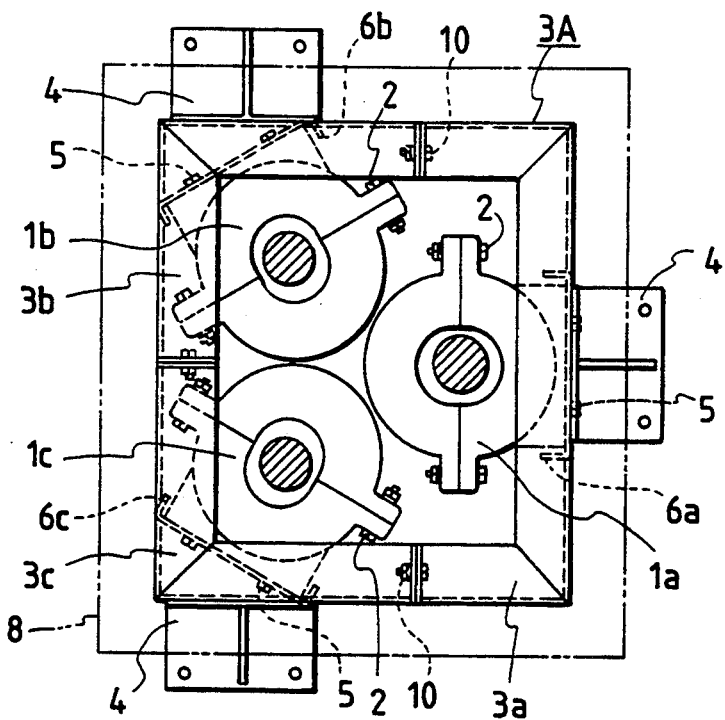
FIG. 12 is a plane view of still another embodiment of the instrument current transformers for power cables according to the present invention.
Figure 13:
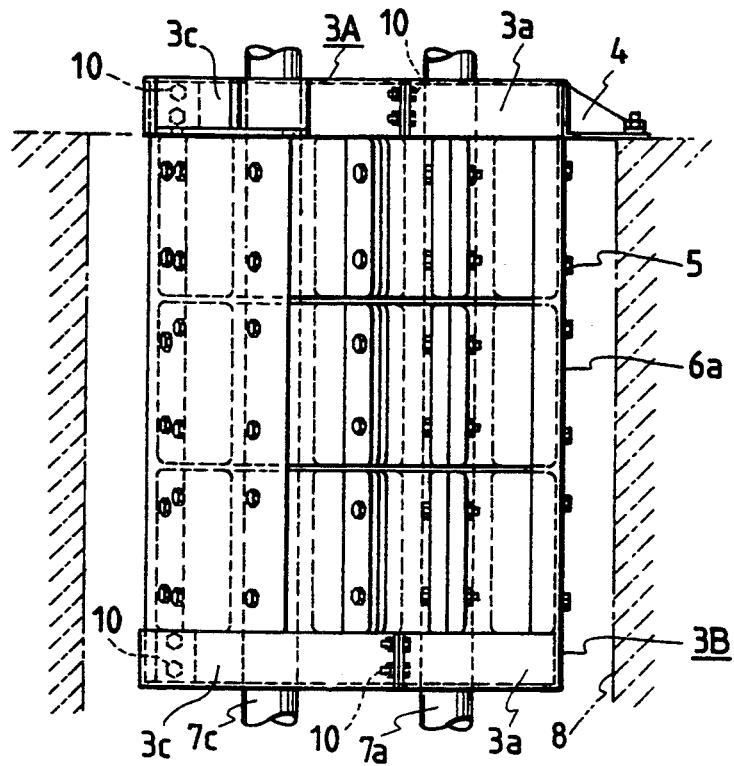
FIG. 13 is a front view of the instrument current transformer for power cables as shown in FIG. 12.

FIGS. 12 and 13 show, respectively, a plane view and a front view of still another embodiment of the instrument current transformers of power cables according to the present invention.

When comparing the present embodiment with the previous embodiments, only the construction of the encircled installation members 3A and 3B differs from those in the previous embodiments. However, the construction of the second encircled installation member 3B is identical with that of the first encircled installation member 3A like in the previous embodiments. Accordingly, only the first encircled installation member 3A is explained here and detailed explanation of other equivalent elements is omitted by adding the same reference marks as in the previous embodiments. As seen from FIG. 12, the completed encircled shape of the first installation member 3A is square, however the first installation member 3A is constituted by connecting three divided installation unit members in the circumferential direction via respective bolts. To the respective installation unit members 3a, 3b and 3c the corresponding axial installation members 6a, 6b and 6c, and current transformer coils 1a, 1b and 1c are fixed. In the present embodiment, three installation unit members 3a, 3b and 3c for the respective phases having a different configuration have to be prepared which reduces productivity. However, with regard to other components substantially the same advantages as in the previous embodiments are obtained. Further, the horizontal cross section of the power cable laying hole 8 is a square shape as illustrated by a two-dot chain line in FIG. 12 and the completed encircled shape of the first encircled installation member 3A is formed into a square shape to meet the square cross section of the power cable laying hole 8. The securing portions 4 for the first encircled installation member 3A are easily secured at the end portions facing to the opening portion of the power cable laying hole 8.

Figure 14:
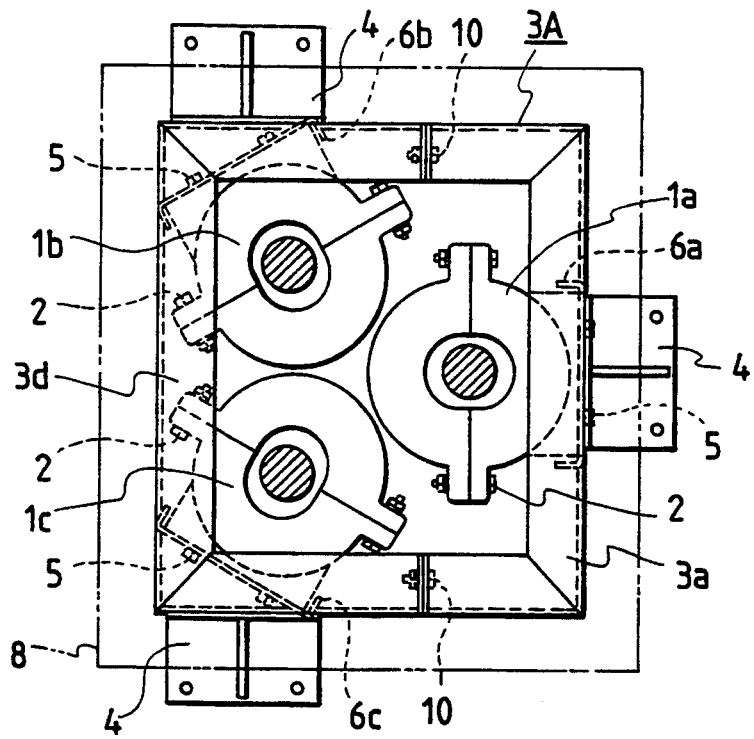
FIG. 14 is a plane view of a further embodiment of the instrument current transformers for power cables according to the present invention.
Figure 15:
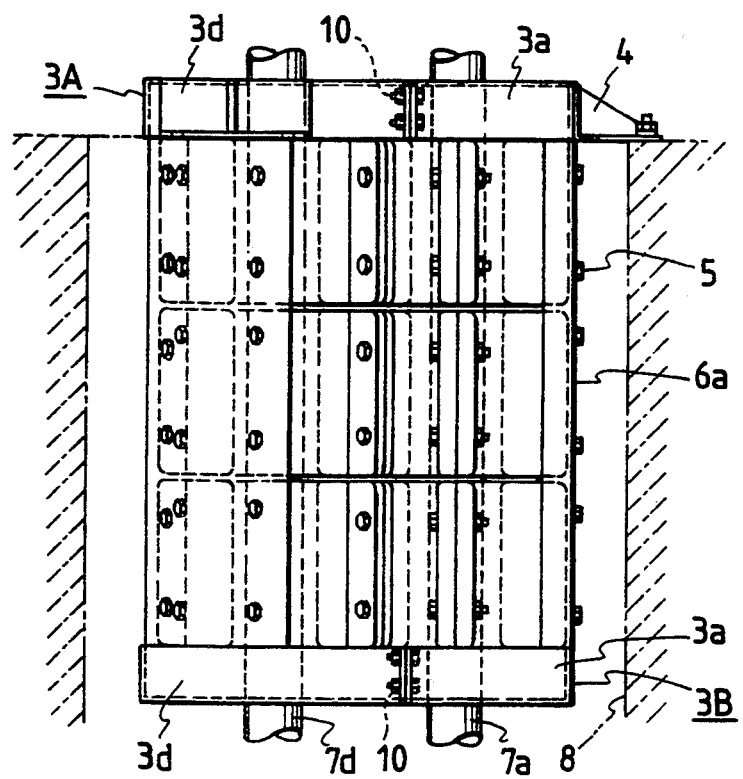
FIG. 15 is a front view of the instrument current transformer for power cables as shown in FIG. 14.

FIGS. 14 and 15 show, respectively, a plane view and a front view of a further embodiment of the instrument current transformers for power cables according to the present invention.

The first and second encircled installation members 3A and 3B have the same configuration as those in the embodiment shown in FIGS. 12 and 13. However the configuration is constituted by connecting two divided installation unit members in a circumferential direction. To one installation unit member 3a among the two divided installation unit members, one axial installation member 6a and one current transformer coil 1a are secured, and further, to the other installation unit member 3d, two axial installation members 6b and 6c and two current transformer coils 1b and 1c are secured. The other constitution of the present embodiment is the same as those in the previous embodiments. With the present embodiment substantially the same advantages as those obtained in the embodiment shown in FIG. 10 and 11 are obtained.

Figure 16:
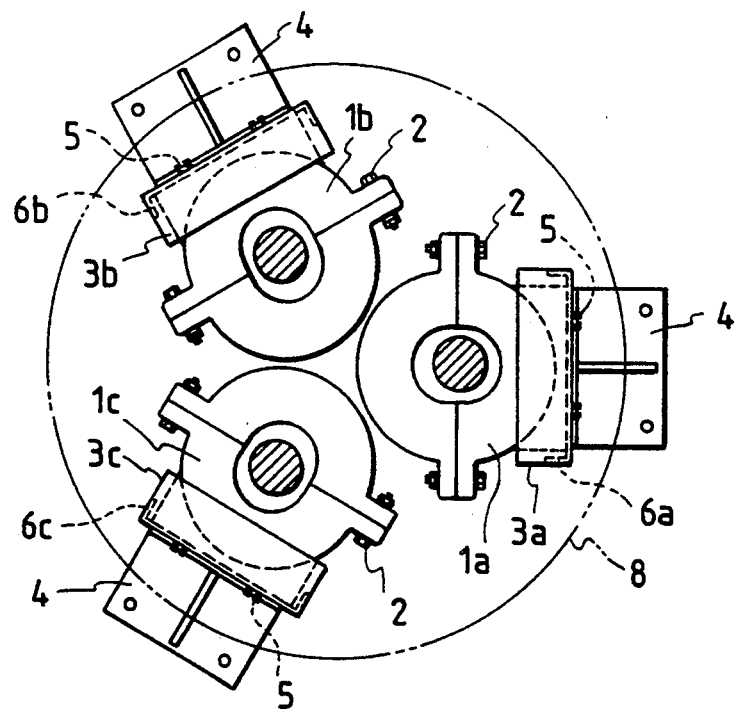
FIG. 16 is a plane view of a still further embodiment of the instrument current transformers for power cables according to the present invention.
Figure 17:
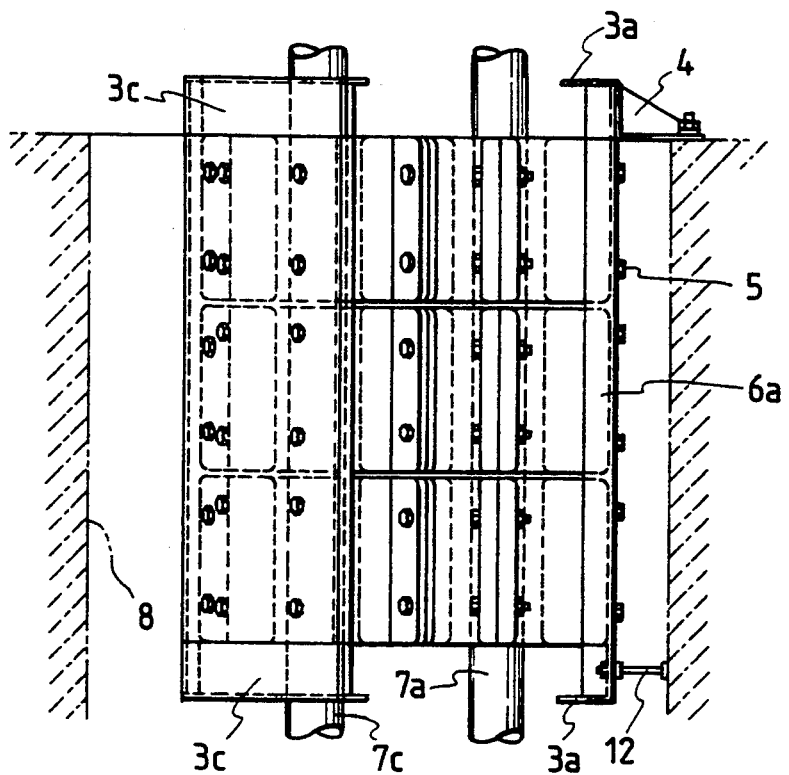
FIG. 17 is a front view of the instruments current transformer for power cables as shown in FIG. 16.
Figure 18:
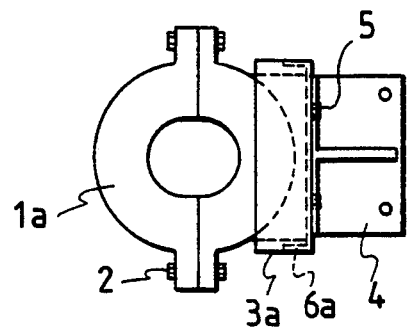
FIG. 18 is a plane view of a major portion of the instrument current transformer for power cables as shown in FIG. 16.
Figure 19:
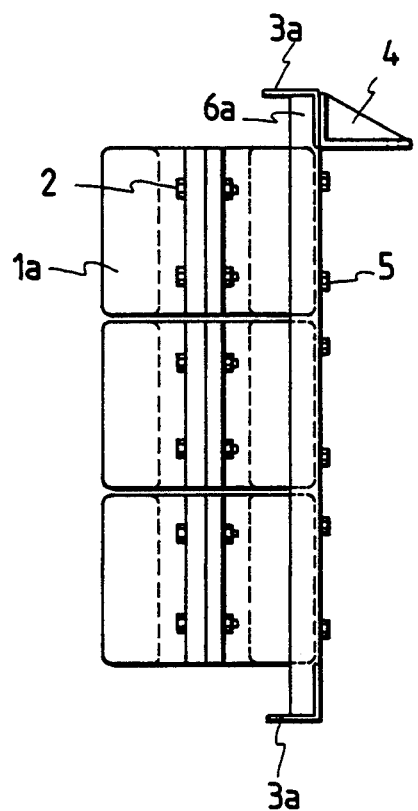
FIG. 19 is a front view of the major portion of the instrument current transformer for power cables as shown in FIG. 18.
Figure 20:
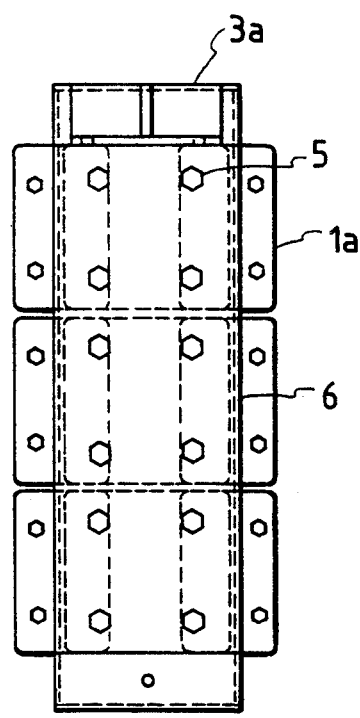
FIG. 20 is a side view of the major portion of the instrument current transformer for power cables as shown in FIG. 18.

FIG. 16 through FIG. 22 show, respectively: a plane view and a front view of a still further embodiment of the instrument current transformers for power cables according to the present invention, a plane view, a front view and a side view of one phase component thereof, and a plane view and a front view of a part of the one phase component. In the present embodiment, the first and second encircled installation members 3A and 3B contained in the previous embodiments are eliminated and since the constitution of the respective phases of the instrument current transformer for power cables is identical, only the constitution of one phase component is explained here. As illustrated in FIG. 18 through FIG. 20 the configuration of the axial installation member 6a is substantially the same as those in the previous embodiments. However, at one end of the axial installation member 6a, an installation unit member 3a with no connecting relation with the adjacent unit members is provided and the installation unit member 3a is provided with a securing portion 4. Further, at the other end of the axial installation member 6a another installation unit member 3a with no connecting relation with the adjacent unit members is also provided. To the other installation unit member 3a, at the other end a fixing bolt 12 is attached and the axial length of the fixing bolt 12 is determined in such a manner that the free end of the fixing bolt 12 contacts the inner wall of the power cable laying hole 8. In the previous embodiments, an electromagnetic reaction force which is caused during various operations such as a short circuiting current flows through the power cables 7a, 7b and 7c is handled by the first and second encircled installation members 3A and 3B as explained above. However, in the present embodiment, a possible electromagnetic reaction force is handled by the inner wall of the power cable laying hole 8 via the fixing bolt 12.

Figure 21:
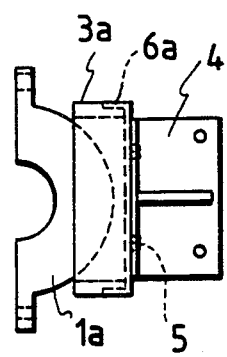
FIG. 21 is a plane view of a part of the major portion of the instrument current transformer for power cables as shown in FIG. 18.
Figure 22:
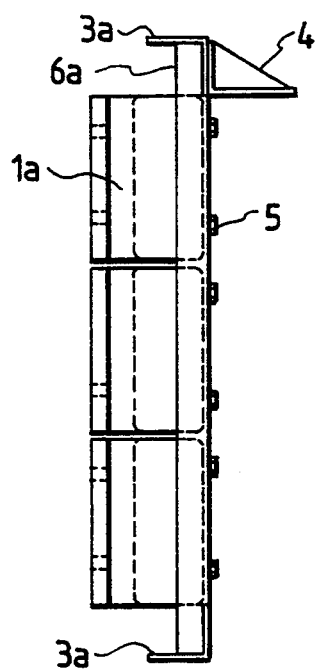
FIG. 22 is a front view of the part of the major portion of the instrument current transformer for power cables as shown in FIG. 21.

When assembling the instrument current transformer for power cables according to the present embodiment, at first the current transformer coil 1a is disassembled by removing the bolts 2 as illustrated in FIGS. 21 and 22, and the respective fixing bolts 12 are attached to the installation unit members 3a, 3b and 3c which are to be provided at the other ends of the respective axial installation members 6a, 6b and 6c as illustrated in FIG. 16 and FIG. 17. Thereafter, the current transformer coils 1a, 1b and 1c are arranged so as to surround the power cables 7a, 7b and 7c as illustrated in FIG. 16 and FIG. 17. The respective securing portions 4 of the upper installation unit members 3a, 3b and 3c are secured at the end portion facing the opening portion of the power cable laying hole 8, and the divided current transformer coils 1a, 1b and 1c are assembled into complete bodies with bolts 2.

According to the present embodiment, although there is no mechanical connecting relationship between the adjacent unit components for the respective phases of the instrument current transformer for power cables, the respective unit components are designed to be inserted through the opening portion located above the power cable laying hole 8 and to assemble the same therein as in the previous embodiments. Accordingly, the assembling work is easily performed even if the size and the stacking height of the gas insulated switch gear device is reduced. Further, in the instrument current transformer for power cables as explained above, the width of the axial installation members 6a, 6b and 6c in a circumferential direction is reduced in order to form a large space between the adjacent axial installation members. Therefore, the work for fastening the bolts 2 for the current transformer coils 1a, 1b and 1c is facilitated because of the large space provided. Moreover, in the present embodiment, since the unit components for the respective phases of the instrument current transformer for power cables are likely constituted in substantially the same configuration, the productivity thereof is increased.

With the instrument current transformer for power cables according to the present invention wherein the installation unit members having a securing portion are secured at end portions facing an opening portion of the power cable laying hole, axial installation members for the respective three phases each connected to the corresponding installation unit member and extending along the power cable laying hole are respectively disposed, and the respective three phase current transformer coils are supported by the corresponding three phase axial installation members. Accordingly, the instrument current transformer for power cables can be easily disposed even when a distance between the installation floor and the lower end of the closed container accommodating the cable heads is small. Accordingly, the small sizing and the stacking height lowering in a gas insulated switch gear device is not disturbed, and further, the instrument current transformer for power cables is secured in the power cable laying hole by making use of the end portion of the power cable laying hole at the side of the opening portion, the disposition work and the installation work thereof are facilitated.

We claim:

1. An instrument current transformer having three current transformer coils for three phases and being connectable to a main power cable which is composed of three power cables for three phases disposed in a power cable laying hole, each of said three current transformer coils being for surrounding a corresponding one of said three power cables, said instrument current transformer comprising:

a plurality of upper circumferential installation unit members disposable near an end portion of said power cable laying hole along circumference sides of an opening portion of said power cable laying hole, each of said upper circumferential installation unit members being provided with at least one securing portion extending in a radial direction and said upper circumferential installation unit members being securable to said end portion of said power cable laying hole via respective said at least one securing portions;

three axial installation members for said three phases, each for extension along corresponding ones of said three power cables, first ends of said axial installation members being connected to said upper circumferential installation unit members and said three current transformer coils for said three phases being supported by corresponding ones of said three axial installation members; and a plurality of lower circumferential installation unit members having substantially a same configuration as corresponding ones of said upper circumferential installation unit members, said lower circumferential installation unit members being connected to second ends of said axial installation members opposite from said first ends.

2. An instrument current transformer as claimed in claim 1, wherein ends of said three power cables for said three phases are connectable to corresponding cable heads accommodated in a closed container of a gas insulated switch gear device locatable above said opening portion of said power cable laying hole.

3. An instrument current transformer as claimed in claim 1, wherein said plurality of upper circumference installation unit members and said lower circumferential installation unit members respectively are mechanically coupled to each other so as to constitute an encircled integral body.

4. An instrument current transformer as claimed in claim 1, wherein each of said plurality of lower circumferential installation unit members is provided with a bolt extending radially so as to be contactable with an inner wall face of said power able laying hole.

5. An instrument current transformer as claimed in claim 1, wherein said plurality of upper circumferential installation unit members and said lower circumferential installation unit members are respectively three upper circumferential installation unit members and three lower circumferential installation unit members having substantially a same configuration.

6. An instrument current transformer as claimed in to claim 5, wherein said plurality of upper circumferential installation unit members and said lower circumferential installation unit members respectively are mechanically coupled to each other so as to constitute an encircled integral body.

7. An instrument current transformer as claimed in to claim 1, wherein each of said three current transformer coils are constituted by first half and a second half formed by dividing each of said three current transformer coils in a circumferential direction, each respective said first half being secured to corresponding ones of said axial installation members and each respective said second half being secured to each corresponding said first half.

* * * * *